United States Patent
Oh

[11] Patent Number: 5,332,956
[45] Date of Patent: Jul. 26, 1994

[54] MOTOR ROTATION CONTROLLING DEVICE

[75] Inventor: Young G. Oh, Seoul, Rep. of Korea

[73] Assignee: Gold Star Co., Ltd., Seoul, Rep. of Korea

[21] Appl. No.: 971,640

[22] Filed: Nov. 5, 1992

[30] Foreign Application Priority Data

Nov. 8, 1991 [KR] Rep. of Korea ............... 91-19845

[51] Int. Cl.$^5$ .............................................. H02P 5/28
[52] U.S. Cl. ................................... 318/799; 318/635; 318/807; 318/798
[58] Field of Search ............... 318/635, 807, 798, 799

[56] References Cited

U.S. PATENT DOCUMENTS

| | | | |
|---|---|---|---|
| 3,643,073 | 2/1972 | Sawamura | 318/635 |
| 4,197,489 | 4/1980 | Dunn et al. | |
| 4,254,367 | 3/1981 | Sakamoto | |
| 4,499,413 | 2/1985 | Izosimov et al. | 318/807 |

FOREIGN PATENT DOCUMENTS 0249465A 6/1987 Japan .
63-0129877A 6/1988 Japan .
010117676A 5/1989 Japan .
2123584 2/1984 United Kingdom .

Primary Examiner—William M. Shoop, Jr.
Assistant Examiner—Karen Masih

[57] ABSTRACT

A motor rotation controlling device, usable for example in a video recorder, to minimize transient phenomena at an initial operation and shorten a transient response time for detecting a rotation speed of a motor, a signal processor for constantly controlling rotation speed of the motor by the detected rotation speed supplied from the rotation detector, a comb-shaped filter for removing a rotation period component and its harmonic component included in a control signal supplied from the signal processor, a controller for varying a transfer function of the comb-shaped filter at a transient response time and a normal time according to the rotation speed of the motor, a driving device for driving a motor by the filtered control signal supplied from the comb-shaped filter, and a limit device connected between the signal processing means and the comb-shaped filter for clamping the control signal.

18 Claims, 8 Drawing Sheets

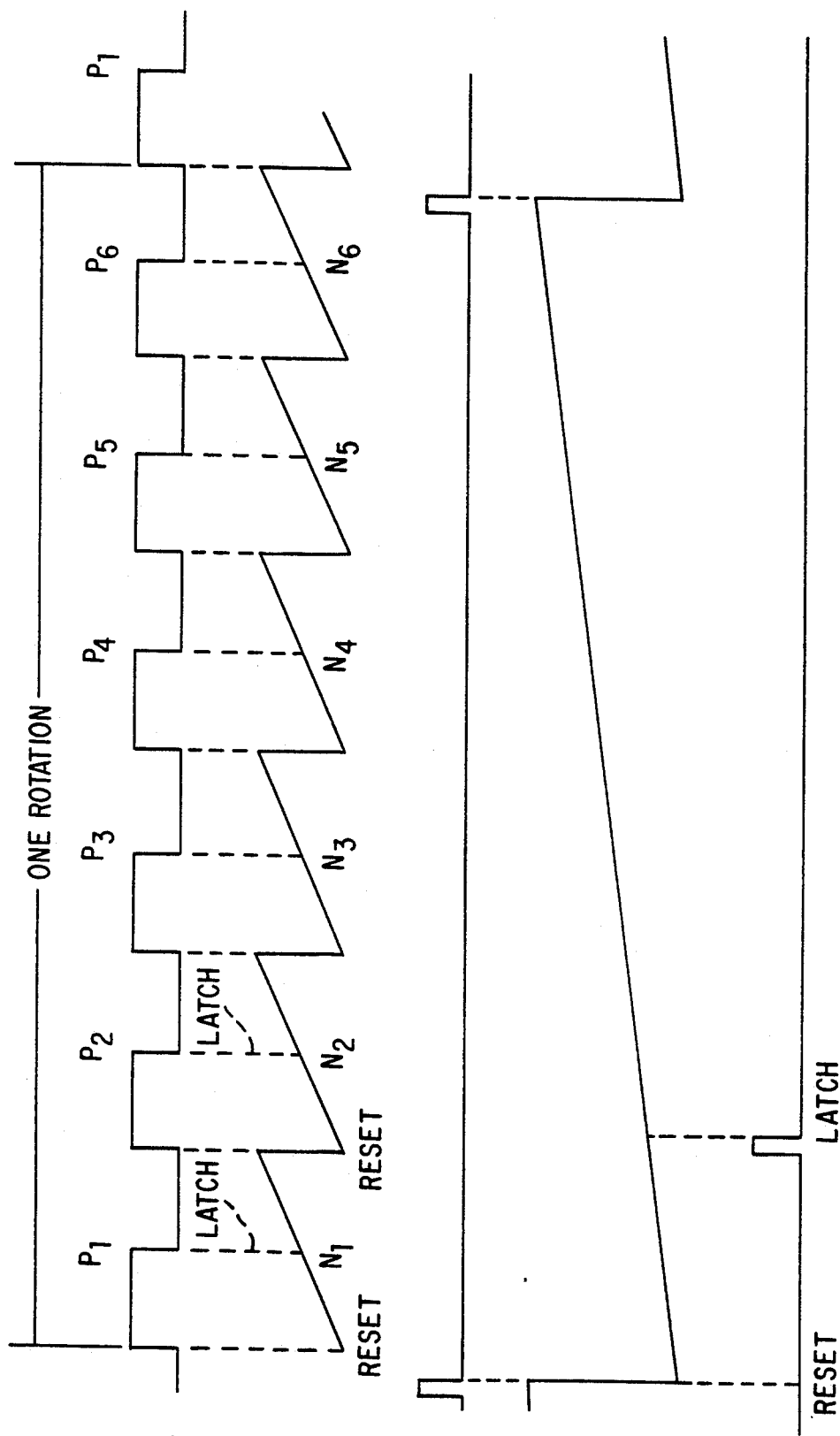

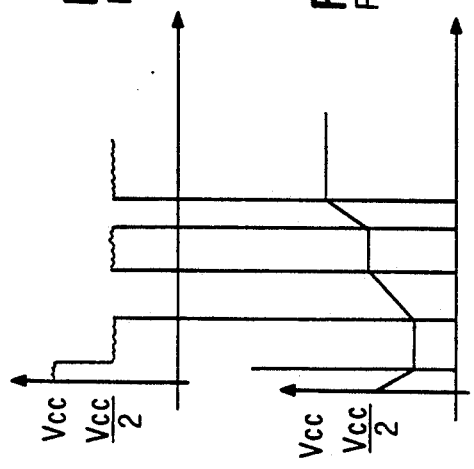
FIG. 4A PRIOR ART
FIG. 4B PRIOR ART
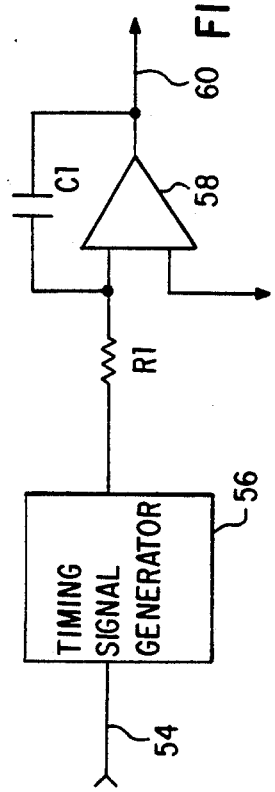
FIG. 3 PRIOR ART
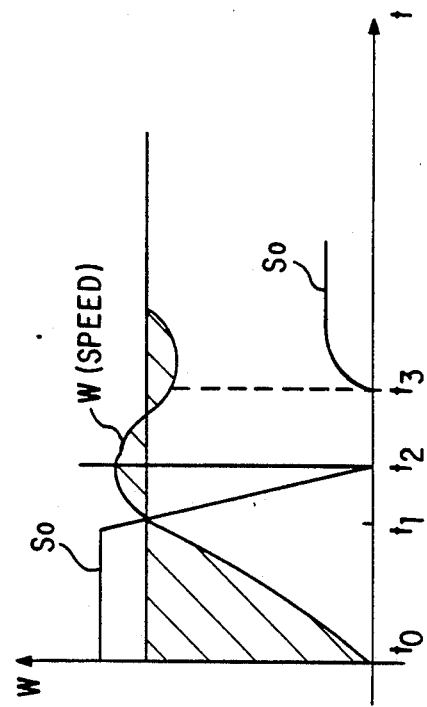
FIG. 6 PRIOR ART
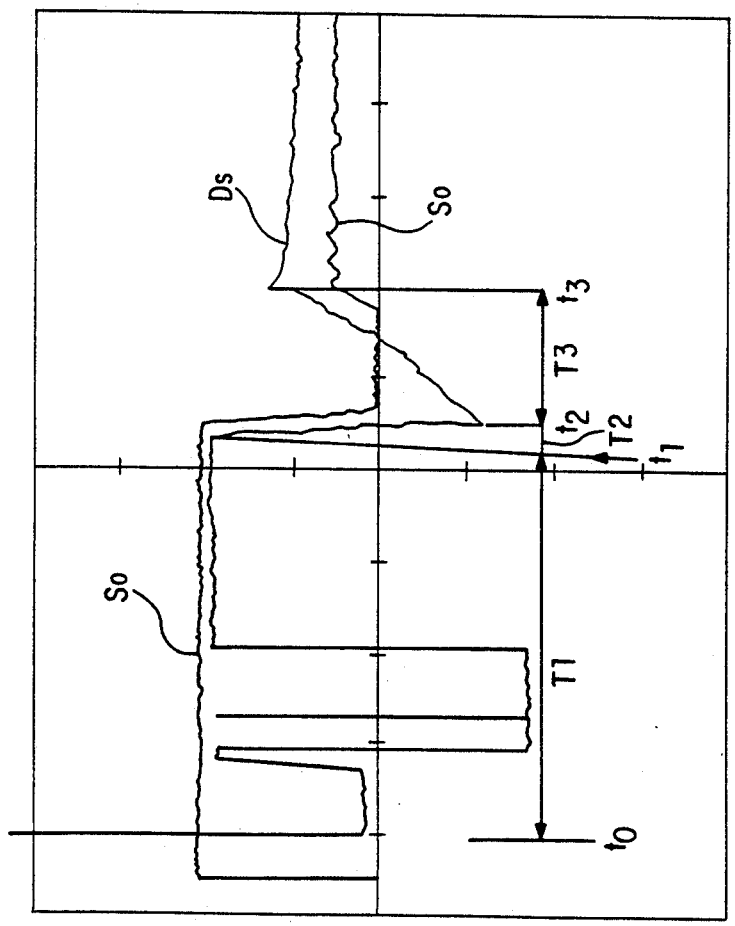
FIG. 5 PRIOR ART

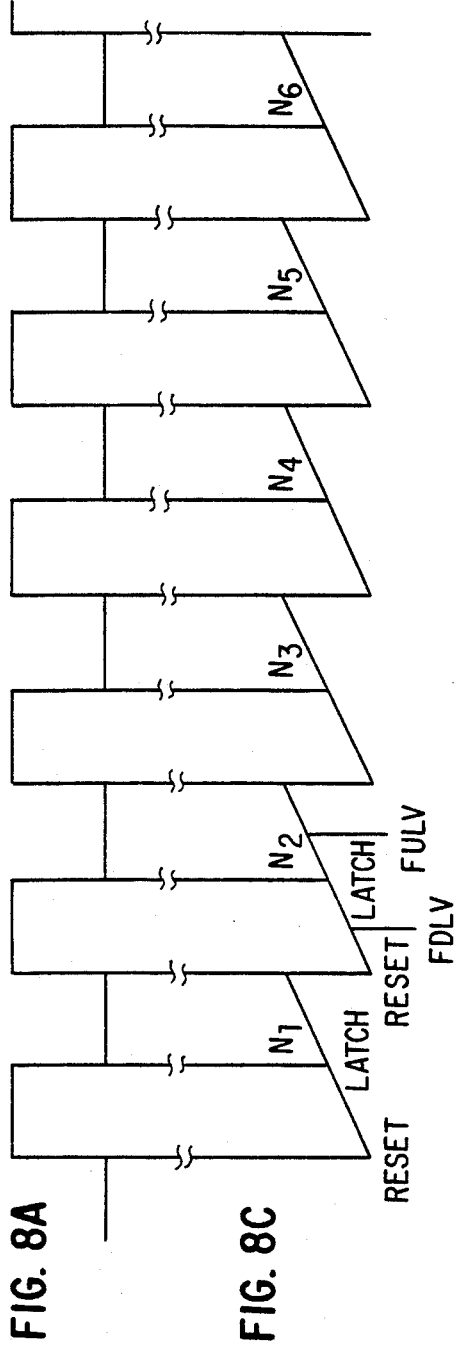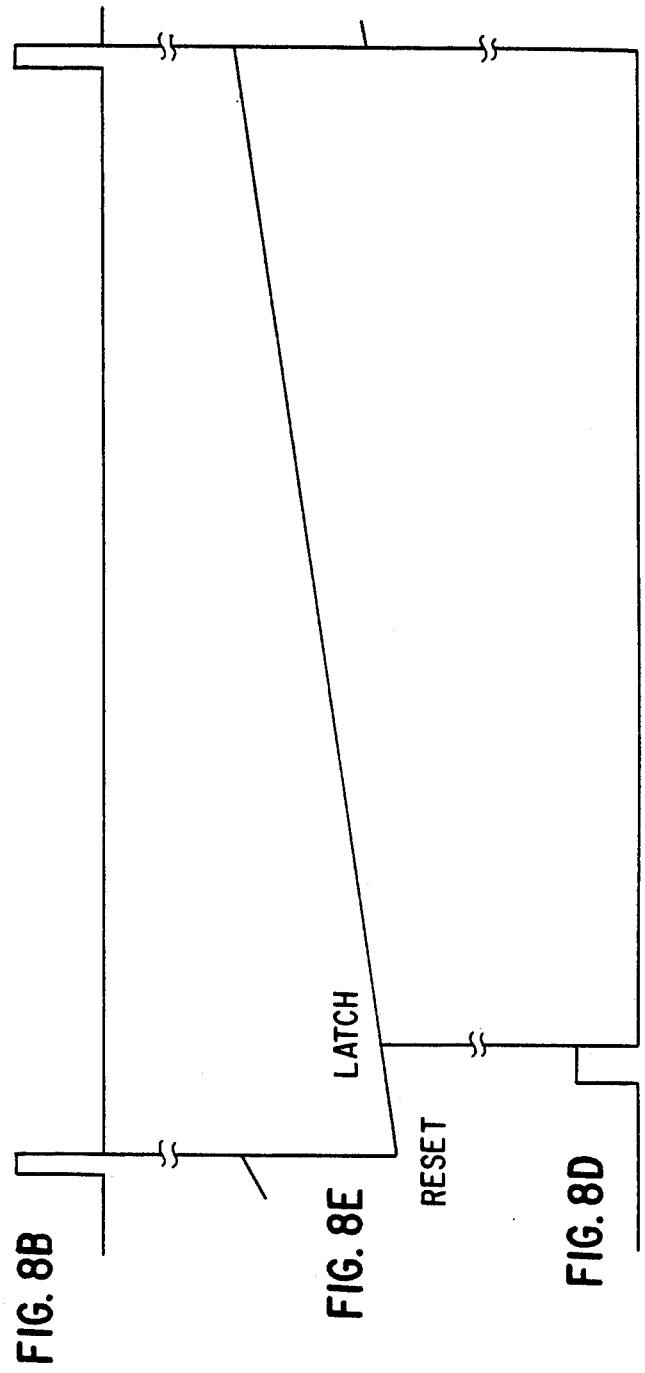

FIG. 11A
|      | CS1 | CS2 |
|------|-----|-----|
| DS   | 0   | 0   |
| FDLV | 0   | 1   |
| FULV | 1   | 0   |
FIG. 11B
|      | RSS | CR1 | CR2 |
|------|-----|-----|-----|
| DSLP | 1   | X   | X   |
| DSLP | 0   | 0   | 0   |
| SDLV | 0   | 1   | 0   |
| SULV | 0   | 0   | 1   |
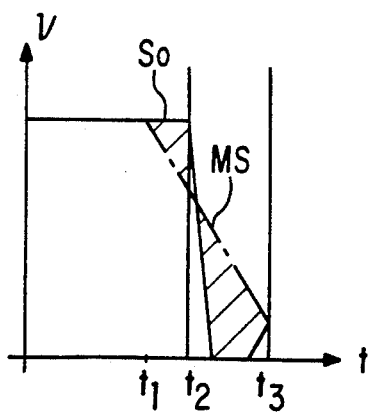
FIG. 13
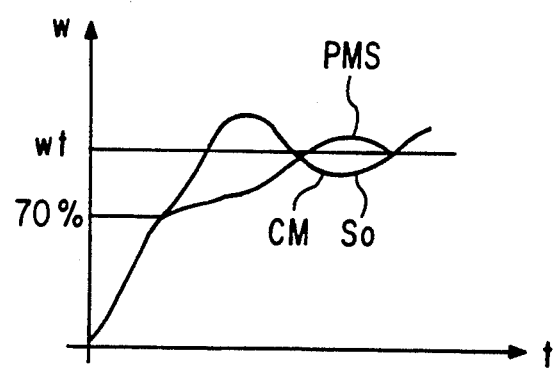
FIG. 14

MOTOR ROTATION CONTROLLING DEVICE

BACKGROUND OF THE INVENTION

The present invention relates to a rotation controlling device suitable to the servo circuit of a motor used in a video cassette recorder, etc., and more particularly to a motor rotation controlling device which can minimize the transient phenomena of motor in an initial operation and the time to arrive at a normal speed.

A rotation controlling device applied to a drum spindle servo circuit of a video cassette recorder (hereinafter referred to as "VCR") detects a rotation speed of a drum motor from a frequency generator signal generated in a frequency generator (hereinafter referred to as "FG") and yields a speed error of drum motor from the detected rotation speed. And, the rotation controlling device compensates the yielded speed error, and supplies the compensated motor driving signal to a drum motor, thereby keeping the speed of drum motor constant. However, since the rotation controlling device includes rotation defect components, i.e., the drum rotation frequency, 30 Hz, and its harmonic component, generated by the eccentricity of drum, the attachment error of the PF, etc., are included in the yielded speed error, it cannot keep the rotation speed of drum motor constant. And, when the rotation controlling device is initially operated like other rotation controlling devices applied to other fields, the time for arriving at a normal speed, i.e., the transient response time, is long, so that there is a problem in that the video signal is muted for a long time at an initial time of reproduction mode or record mode of VCR.

An improved rotation controlling device to solve the above problem is described in Japanese laid-open Patent No. Sho 63-129877 and No. Pyung 1-117676. The rotation controlling device described in No. Sho 63-129877 removes the unnecessary rotation defect components, i.e., durum rotation frequency, 30 Hz, and its harmonic component, included in the speed error signal yielded by a notch filter in a normal driving mode and drives the drum motor by a motor driving signal compensating the rotation defect component removed speed error signal, thereby keeping the rotation speed of drum motor constant. However, the rotation controlling device described in No. Sho 63-129877 utilizes the notch filter only in a normal driving mode, so that it has the problem of consuming a long time for the rotation speed of drum motor to reach normal speed in an initial operation.

To improve the problem of the rotation controlling device described in No. Sho 63-129877, the rotation controlling device described in No. Pyung 1-117676 varies the transfer function of the notch filter according to the initial operation and the normal speed drive. Thus, in a normal speed drive, even if the gain of a pure speed error component, i.e., "0" Hz component, is decreased, the relatively large rotation defect component is removed, and also in an initial operation, even if the rotation defect component is not completely removed, the gain of zero Hz component increases. However, the rotation controlling device described in No. Pyung 1-117676 can shorten the time for the drum motor speed to reach a normal speed in an initial operation, but there are problems in that the transient phenomena in the motor speed are made more severe by the acceleration of the motor speed and the long time for the drum motor to keep at a normal speed, i.e., a long stabilized time, is consumed. The problems are described with reference to the attached drawings as follows.

With reference to FIG. 1, a conventional rotation controlling device comprising a drum motor 10 and a rotation detector 12 installed in the drum motor 10 is described. The rotation detector 12 comprises an FG head 14 for generating an FG pulse, as shown in FIG. 2A, having a frequency according to a rotation speed of drum motor and a phase generator (hereinafter referred to as "PG") head 16 for generating a PG pulse, as shown in FIG. 2B, according to a rotation phase of the drum motor 10. The PG pulse having one pulse per rotation of drum motor 10 is supplied to a control signal generating circuit 32, and on the other hand, the FG pulse having 6 pulses per rotation of the drum motor 10 is supplied to a control signal generating circuit 18. The first control signal generating circuit 18 resets a counter 20 at the rising edge of the FG pulse as shown in FIG. 2C to start to count, and samples the values $N_1$, $N_2$, $N_3$, ... counted by the counter 20 at the falling edge of the FG pulse. The sampled count values $N_1$, $N_2$, $N_3$, ... which are speed error data DS are supplied to a digital notch filter 22 and a control circuit 24. The counter 20 counts up by a clock pulse from a clock generator (not shown) received through an input terminal 48. The control circuit 24 determines an initial operation mode or a normal mode according to a logic value of the speed error data, and varies a transfer function of the comb-shaped filter 22 according to the determined result. Under the control circuit 24, even if the rotation defect component is not removed at an initial driving mode, the comb-shaped filter 22 filters the speed error data DS for the gain of 0 Hz component not to be damped, and at a normal mode, even if the 0 Hz component gain is damped, the speed error data DS is filtered to remove the rotation defect component. A multiplier 26 multiplies the filtered speed error data supplied from the comb-shaped filter 22 by a multiplier coefficient $K_1$ and supplies the multiplied speed error data to an adder 42. And a differentiator 28 differentiates the filtered speed error data supplied from the comb-shaped filter 22 and generates angular acceleration data. A multiplier 30 multiplies the angular acceleration data generated in the differentiator 28 by a multiplier coefficient $K_0$ and supplies the multiplied angular acceleration data to the adder 42.

Meanwhile, the second control signal generating circuit 32 resets a counter 34 at the falling edge of the PG pulse supplied from the PG head 16 to start to count. The counter 34 counts up by 1 by a clock pulse supplied through a second input terminal 50 from a clock generator (not shown), samples the counted value at the falling edge of a vertical sync signal such as FIG. 2D supplied through a third input terminal 52 from a sync signal separating circuit (not shown) and supplies the sampled count value as phase error data DP to an integrator 36 and a multiplier 40. The integrator 36 integrates the phase error data DP, and the multiplier 38 multiplies the phase error data integrated in the integrator 36 by a multiplier coefficient $K_3$ and supplies the integrated and multiplied phase error data to the adder 42. Also, the multiplier 40 multiplies the phase error data DP supplied from the counter 34 by a multiplier coefficient $K_2$ and supplies the multiplied phase error data to the adder 42. The adder 42 adds the data from the multipliers 26, 30, 38 and 40 and supplies the added data to a digital-analog (hereinafter referred to as "D-A") converter 44. The D-A converter 44 converts the added data supplied from the adder 42 into an analog signal and supplies the converted analog signal to a driving circuit 46 as a speed control signal. The driving circuit 46 controls the speed of the drum motor 10 according to the voltage level of the speed control signal.

FIG. 3 shows a detailed circuit diagram of the D-A converter 44 shown in FIG. 1, and FIGS. 4A and 4B show output waveform diagrams at the respective portions of FIG. 3. In FIG. 3, a timing signal generator 56 generates a pulse width modulated signal having a width corresponding to a logic value of digital data received through an input terminal 54 from the adder 42 shown in FIG. 1. The pulse width modulated signal, a signal having three logic states, as shown in FIG. 4A has a low logic with respect to a high impedance level when the digital data has a plus logic value and to the contrary, has a high logic with respect to a high impedance level when the digital data has a minus logic data. And the pulse period of the pulse width modulated signal has the same period as that of the FG pulse. An operational amplifier 58 constituting an integrator circuit together with a resistor R1 and a capacitor C1 charges/discharges for a pulse width interval according to a logic state of pulse width modulated signal supplied from the timing signal generator 56, thereby generating a speed control signal of analog signal form as shown in FIG. 4B. In more detail, the operational amplifier 58 charges a voltage in a capacitor C1 for a pulse interval when a pulse width modulated signal of low logic state is input, and contrarily, discharges the voltage charged in the capacitor C1 for a pulse interval when a pulse width modulated signal of high logic state is input. The time constant $\tau$ of charging/discharging of the capacitor C1 is $1/(R_1 C_1)$ and the voltage charged in the capacitor C1 is supplied to the driving circuit 46 shown in FIG. 1 through an output terminal 60 as a speed control signal So.

FIG. 5 shows speed error data DS outputted from the comb-shaped filter 22 shown in FIG. 1 at an initial operation and a speed control signal So outputted from the D-A converter 44. In FIG. 1, the speed error data DS has a maximum value during the interval $T_1$, i.e. from the time $t_0$ to start to drive the drum motor 10 to the time $t_1$ for the drum motor to reach the first target (or normal) speed, and rapidly decreases to have a minus value during the interval $T_2$, i.e., from the time $t_1$ to the time for the drum motor 10 to rotate with a maximum speed, and slowly increases during the interval $T_3$, i.e., from the time $t_2$ for the drum motor 10 to have a maximum speed to the time $t_3$ to be driven with a normal driving mode. Meanwhile, the speed control signal So keeps the output voltage at a maximum according to the speed error data DS during the interval from the time $t_0$ for the drum motor 10 to be initially operated to the time $t_1$ for the drum motor 10 to reach a target speed, and rapidly decreases to "0" level during the interval from the time $t_1$ for the drum motor 10 to reach the target speed to the time $t_2$ for the drum motor 10 to have a maximum speed. And, the motor speed control signal So keeps "0" level for a constant interval during the interval from the time $t_2$ for the drum motor 10 to rotate at a maximum speed to the time $t_3$ to be operated at a normal driving mode.

FIG. 6 shows a rotation speed of the drum motor 10 according to the speed control signal So outputted from the D-A converter 44 shown in FIG. 1, at an initial operation. In FIG. 6, the drum motor 10 is driven and accelerated by a speed control signal of maximum voltage from the driving started time $t_0$, and reaches the target speed at the time $t_1$, and then reaches the maximum speed at the time $t_2$ by rotation inertia even if the speed control signal So is decreased to the "0" level from the maximum value from the time $t_1$. And the drum motor 10 is rapidly decelerated from the time $t_2$ and is driven with a normal control mode by a speed control signal So starting to be increased at the time $t_3$ having below target speed.

As described above, at the initial operation, the conventional rotation controlling device completely detects the error near Hz even if the rotation defect component having a relatively low level is included, and accelerates the motor by the detected error value, so that the transient phenomena are severed and the transient response time until it is driven with a normal driving mode for keeping the target speed constant, lengthens. Moreover, the conventional rotation controlling device utilizing a D-A converter having an integrator for increasing/decreasing by steps the voltage value of the speed control signal by a voltage corresponding to an error amount according to the error amount of motor, has the problem of having more severe transient response characteristic due to a slow response characteristic of the motor speed control signal with respect to the speed variation. Because of these problems, a VCR mutes the video signal for a long time at the initial reproduction and record, thereby inconveniencing the consumer and decreasing the reliability of the VCR.

SUMMARY OF THE INVENTION

Accordingly, it is an object of the present invention to provide a rotation controlling device which can finely improve the transient response characteristic of a motor.

To achieve the object, the rotation controlling device of the present invention comprises:
- a rotation detecting means for detecting the rotation speed of motor;
- a signal processing means for generating a control signal for constantly controlling the rotation speed of the motor by the detected rotation speed supplied from the rotation detecting means;
- a comb-shaped filter means for removing a rotation period component and its harmonic component included in a control signal supplied from the signal processing means;
- a control means for varying a transfer function of the comb-shaped filter means at a transient response time and a normal time according to a rotation speed of the motor;
- a driving means for driving a motor by a filtered control signal supplied from the comb-shaped filter means; and
- a limit means connected between the signal processing means and the comb-shaped filter means, for clamping the control signal.

BRIEF DESCRIPTION OF THE DRAWINGS

The above object and other advantages of the present invention will become more apparent by describing the preferred embodiment of the present invention with reference to the attached drawings, in which;

FIGS. 2A to 2E show output waveform diagrams and operation characteristic view at the respective portions shown in FIG. 1;

FIG. 3 is a detailed circuit diagram of the D-A converter shown in FIG. 1;

FIGS. 4A and 4B show output waveform diagrams of the timing signal generator and the integrator shown in FIG. 3;

FIG. 5 shows an output characteristic view of the D-A converter for the output of digital notch filter shown in FIG. 1, at an initial operation;

FIG. 6 shows a view illustrating a rotation angular speed of motor for the output of the D-A converter shown in FIG. 1, at an initial operation;

FIGS. 8A to 8E show output waveform views and operation characteristic views at the respective portions shown in FIG. 7;

FIGS. 11A and 11B show truth tables explaining the operations of the controlling switches shown in FIG. 9;

FIG. 13 shows a view illustrating a control characteristic of a rotation controlling device of the present invention, compared with the conventional rotation controlling device; and FIG. 14 shows a transient response characteristic of motor by the rotation controlling device in the present invention, compared with a transient response characteristic of motor by the conventional rotation controlling device.

DETAILED DESCRIPTION OF THE INVENTION

Figure 1:
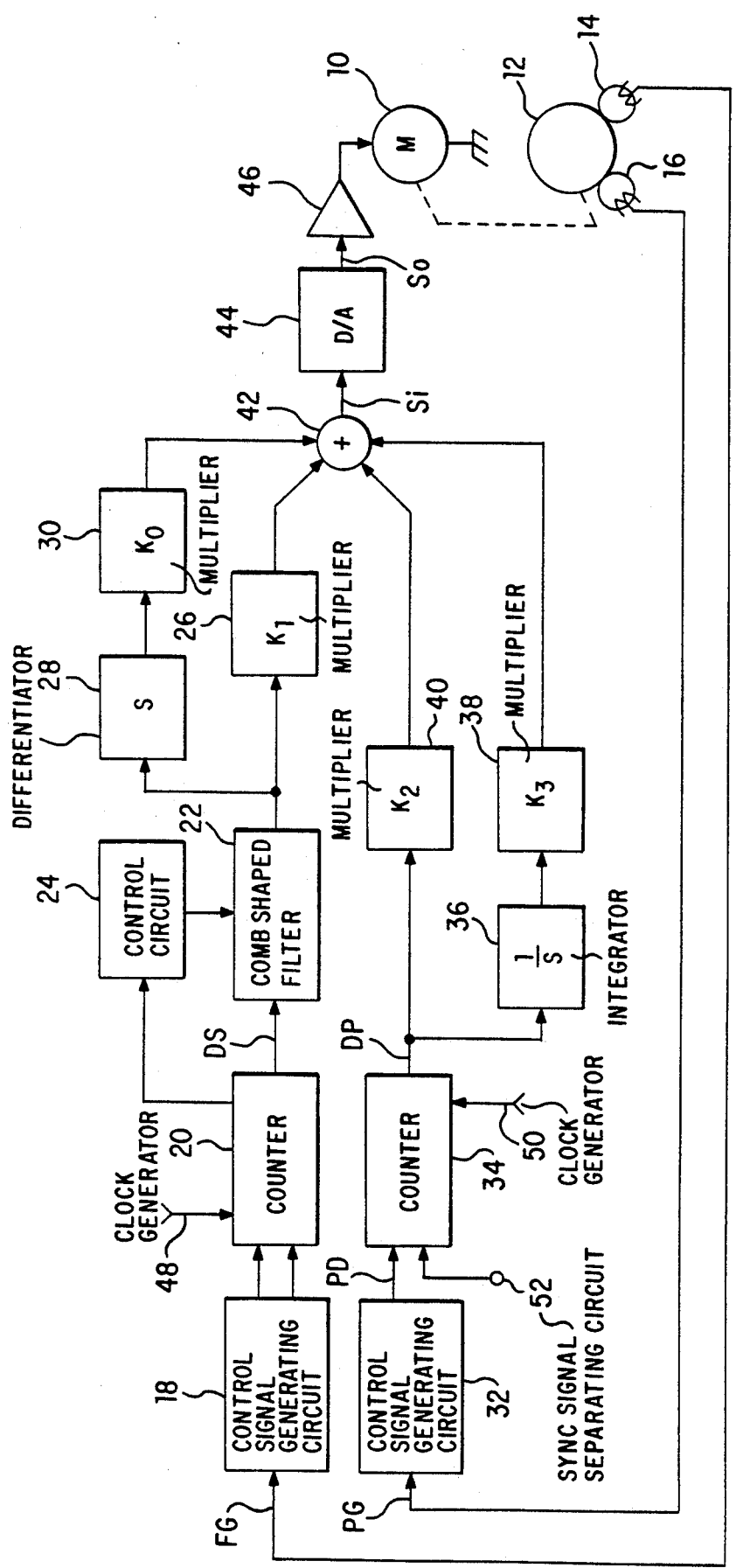
FIG. 1 is a block diagram of a conventional rotation controlling device adapted to a VCR.
Figure 7:
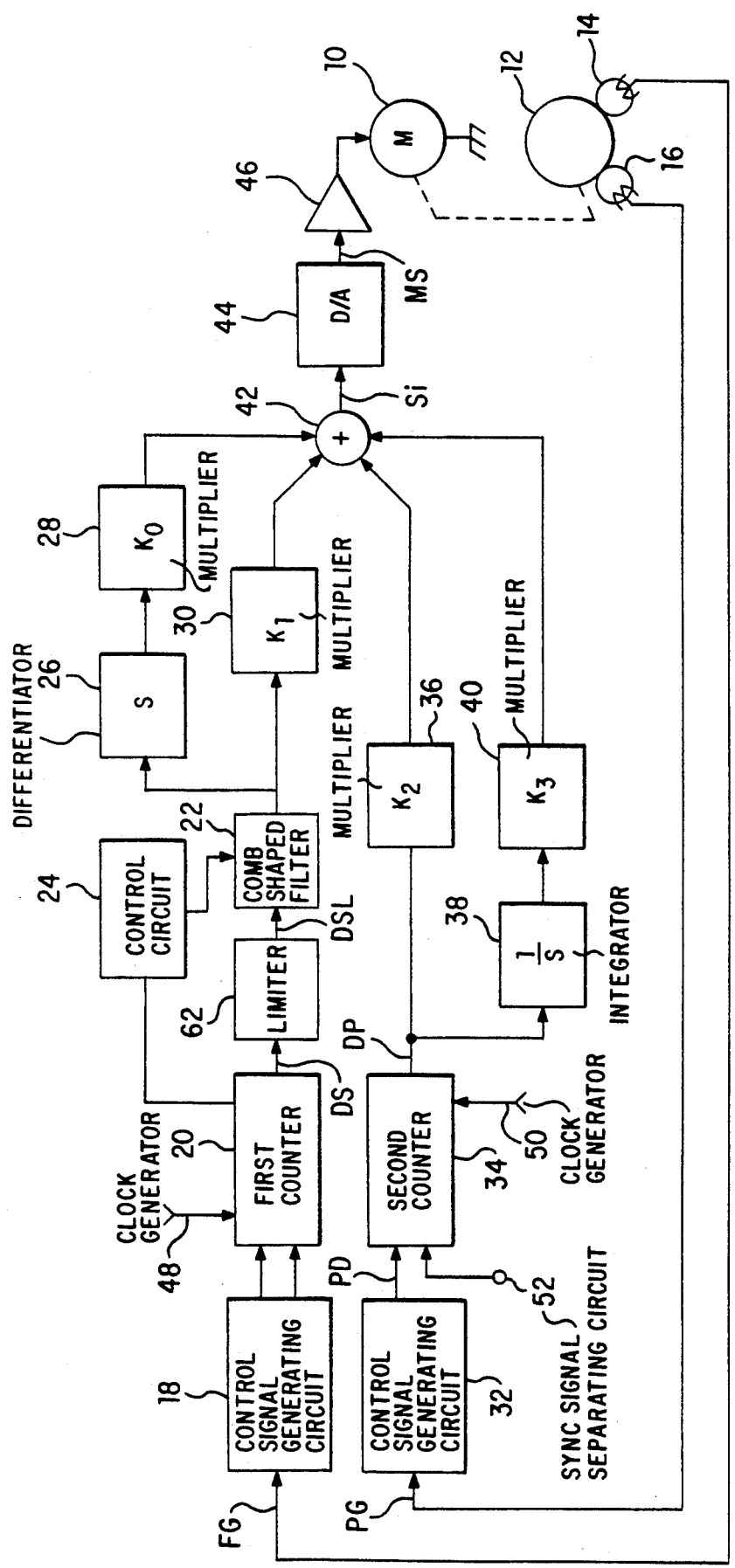
FIG. 7 is a block diagram of a rotation controlling device according to an embodiment of the present invention adaptable to a VCR.

FIG. 7 is a block diagram of a rotation controlling device according to an embodiment of the present invention, applied to a VCR. In FIG. 7, the rotation controlling device comprises a drum motor 10 for rotating a drum (not shown) and a rotation detector 12 installed in the drum motor 10, for detecting a rotation speed of the drum motor 10. The rotation detector 12 comprises an FG head 14 generating an FG pulse, as shown in FIG. 8A, having a frequency according to a rotation speed of the drum motor 10 and a PG head 16 generating a PG pulse, as shown in FIG. 8B, according to a rotation phase of the drum motor 10. The FG pulse has 6 pulses per rotation of the drum motor 10 and the PG pulse has a pulse per rotation of the drum motor 10.

The rotation controlling device comprises a first control signal generating circuit 18 for controlling a first counter 20, as shown in FIG. 7C, by an FG pulse generated in the FG head 14. The first control signal generating circuit 18 supplies a reset signal to a reset terminal of the first counter 20 at the rising edge of the FG pulse, thereby resetting the first counter 20 to start to count. The first control signal generating circuit 18 supplies a latch signal to an output control terminal of the first counter 20 at the falling edge of the FG pulse, to sample the count value N1, N2, N3, . . . counted in the first counter 20, and supplies the sampled count value N1, N2, N2, . . . to a control circuit 24 and a limiter 62 as speed error data DS. The first counter 20 is reset by a reset signal supplied from the first control signal generating circuit 18, and then counts up by a clock pulse train supplied through a first input terminal 48 from a clock generator (not shown) to generate a count value of sawtooth waveform shown in FIG. 8C. The first counter 20 supplies the count value N1, N2, N3, . . . to the control circuit 24 and the limiter 62 when a latch pulse is supplied from the first control signal generating circuit 18.

In the rotation controlling device, the limiter 62 receiving speed error data from the first counter 20 clamps the speed error data to predetermined upper and lower limit values and supplies the clamped speed error data DSL to a comb-shaped filter 22. The limiter 62 supplies a predetermined lower limit value to the comb-shaped filter 22 as speed error data DSL when the speed error data DS exceeds the upper limit value for more than a predetermined interval. Contrarily, the limiter 62 supplies a predetermined upper limit value to the comb-shaped filter 22 as the clamped speed error data, when the speed error data DS is below the lower limit value for more than a predetermined interval.

Meanwhile, a control circuit 24 receiving the speed error data DS from the first counter 20 determines an initial operation mode or a normal mode by speed error data DS, and varies a transfer function of the comb-shaped filter 22 according to the determined mode. The comb-shaped filter 22 has different transfer functions according to an initial operation motor and a normal mode under the control of the control circuit 24 and rejects the clamped speed error data supplied from the limiter 62 and supplies the rejected speed error data to a differentiator 26 and a second multiplier 30. In the rejected speed error data outputted in the comb-shaped filter 22, a rotation period of drum at a normal mode, 30 Hz, and its harmonic component are completely removed and a gain damped "0" Hz component is included. And at an initial operation mode, the rejected speed error data outputted in the comb-shaped filter 22 includes a little 30 Hz, its harmonic component, and the gain non-damped zero Hz component. The differentiator 26 differentiates the rejected speed error data to generate angular acceleration data. The angular acceleration data generated in the differentiator 26 is multiplied by a multiplier coefficient Ko in a first multiplier 28. Also, the second multiplier 30 multiplies the rejected speed error data supplied from the comb-shaped filter 22 by a multiplier coefficient $K_1$.

Also, the rotation controlling device comprises a second control signal generating circuit 32 for controlling a second counter 34 by a PG pulse supplied from the PG head 16. The second control signal generating circuit 32 generates a reset signal at the falling edge of the PG pulse and supplies the generated reset signal to the second counter 34, thereby resetting the second counter 34 to start to count. The second counter 34 is reset by a reset signal supplied from the second control signal generating circuit 32, and counts up by 1, as shown in FIG. 8D, by a clock pulse train supplied from the clock generator (not shown) through a second input terminal 50. The second counter 34 samples the counted value at the falling edge of a vertical sync signal, such as FIG. 8E, supplied from a sync signal generator (not shown) and supplies the sampled count value to a third multiplier 36 and the integrator 38 as phase error data DP. The third multiplier 36 multiplies the phase error data DP supplied from the second counter 34 by a multiplier coefficient $K_2$, to generate the $K_2$ times multiplied phase error data. Meanwhile, the integrator 38 integrates the phase error data DP supplied from the second counter 34 and supplies the integrated phase error data to a fourth multiplier 40. The fourth multiplier 40 multiplies the integrated phase error data supplied from the integrator 38 by a multiplier coefficient $K_3$.

The rotation controlling device additionally comprises an adder 42 for adding the data multiplied in the first to fourth multipliers 28, 30, 36 and 40 and supplying the added data to a D-A converter 44. The D-A converter 44 converts the added data supplied from the adder 42 into an analog signal form and supplies the converted analog signal to a driving circuit 46 as a speed control signal MS. The driving circuit 46 drives the drum motor 10 according to the speed control signal MS. The D-A converter 44 has the same constitution as that shown in FIG. 3.

Figure 9:
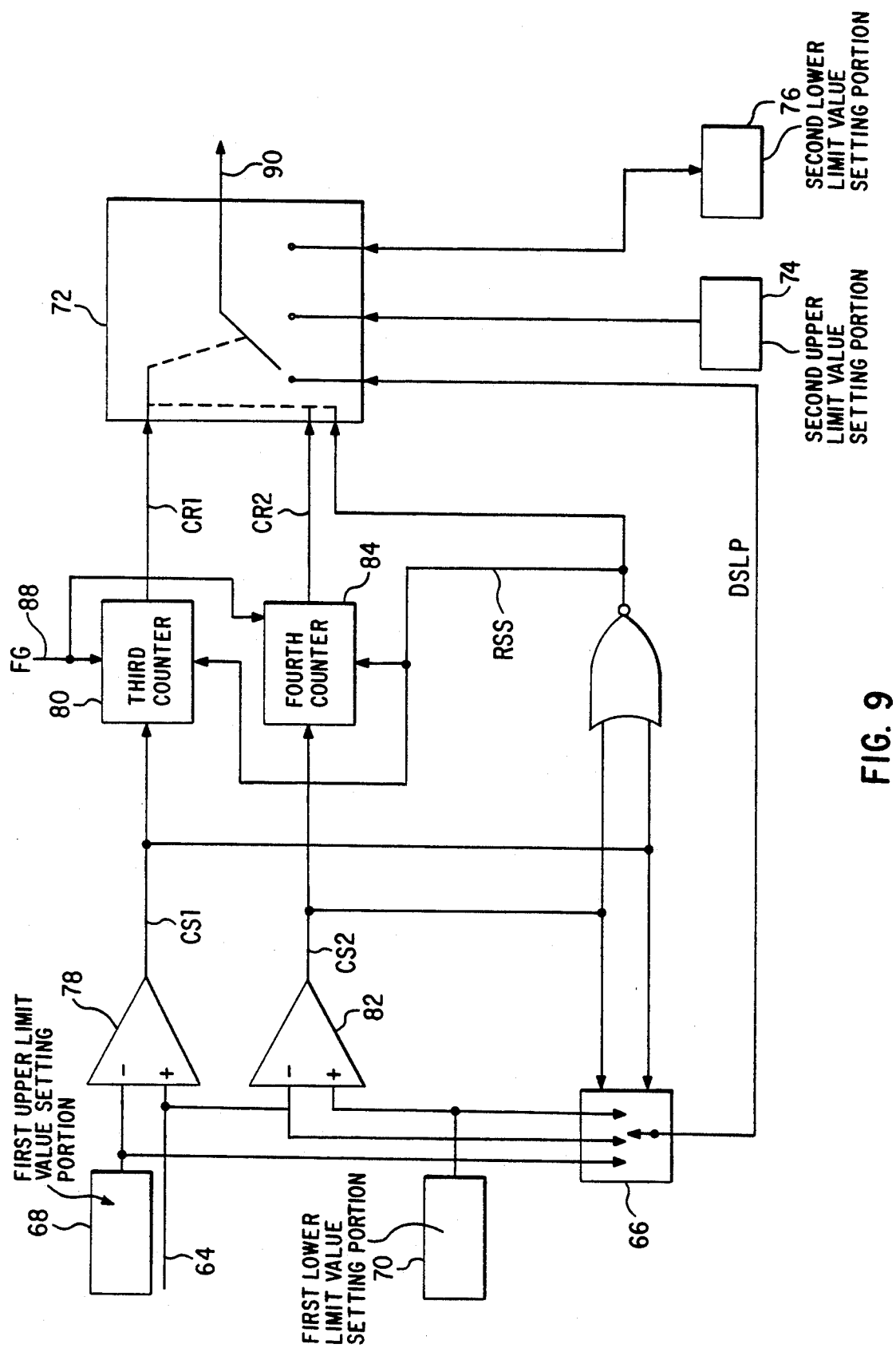
FIG. 9 is a detailed block diagram of a limiter shown in FIG. 7.

FIG. 9 is a detailed block diagram of the limiter 62 shown in FIG. 7. With reference to FIG. 9, the limiter 62 comprises a first controlling switch 66 for receiving in a fixing terminal the speed error data DS from the first counter 20 shown in FIG. 7 through an input terminal 64. The first controlling switch 66 additionally comprises another fixing terminal for receiving a first upper limit value FULV from a first upper limit value setting portion 68, the other fixing terminal for receiving a lower limit value FDLV from a lower limit value setting portion 70, and a moving terminal for selecting the data supplied to the three fixing terminals. The moving terminal of the first controlling switch 66 selects, as shown in the operation truth table shown in FIG. 11A, the first upper limit value FULV supplied from the first upper limit value setting portion 68, a first lower limit value FDLV supplied from the first lower limit value setting portion 70, or the speed error data DS supplied to the input terminal 64, according to the logic values of the comparing signals CS1 and CS2 supplied from the first and second comparators 78 and 82. In more detail, the first controlling switch 66 selects a first upper limit value FULV supplied from the first upper limit value setting portion 68 when an output signal CS1 of the first comparator 78 is a high logic state, and a first lower limit value FDLV supplied from the first lower limit value setting portion 70 when the output signal CS2 of the second comparator 82 is a high logic state, and the speed error data DS supplied to the input terminal 64 when the output signals CS1 and CS2 of the first and second comparators 78 and 82 are both low logic states. The first comparator 78 compares the first upper limit value FULV supplied to its inverting terminal (−) from the first upper limit value setting portion 68 with the speed error data DS supplied to its non-inverting terminal (+) from the input terminal 64, and generates a comparing signal CS1 of high logic state when the first upper limit value FULV is greater than the speed error data DS. On the other hand, the second comparator 82 compares the first lower limit value FDLV supplied to its non-inverting terminal (+) from the first lower limit value setting portion 70 with the speed error data DS supplied to its non-inverting terminal (−) from the input terminal 64, and generates a comparing signal CS2 of high logic state when the first lower limit value FDLV is greater than the speed error data DS.

Figure 10A:
FIGS. 10A to 10E show output waveform views at the respective portions shown in FIG. 9.
Figure 10B:
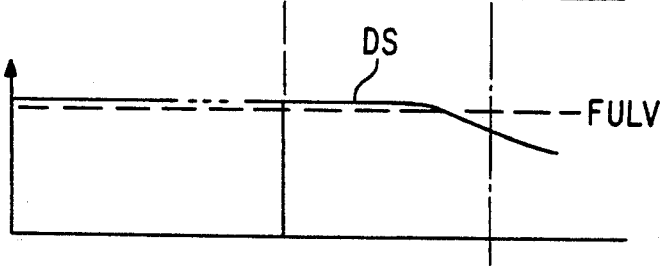
Figure 10C:
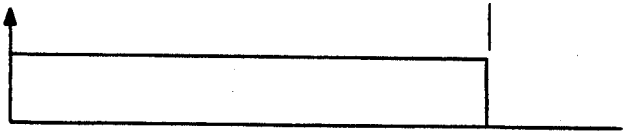
Figure 10D:
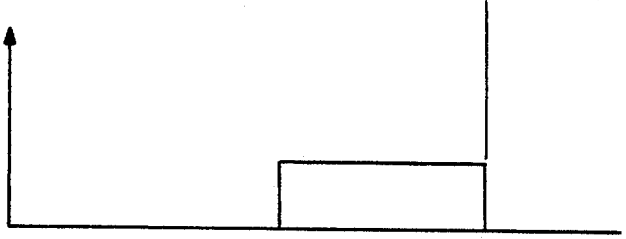
Figure 10E:
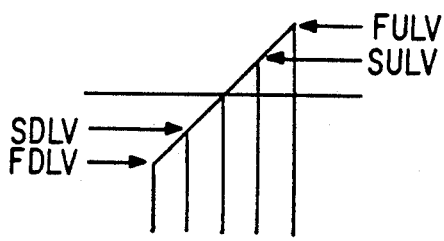

The limiter 62 comprising a first fixing terminal for receiving the output data of the moving terminal of the first controlling switch 66, a second fixing terminal for receiving a second upper limit value SULV from the second upper limit value setting portion 74, and a third fixing data for receiving a second lower limit value SDLV from the second lower limit value setting portio 76. The second controlling switch 72 additionally comprises a moving terminal for selecting the output data DSLP of the first controlling switch 66, the second upper limit value SULV supplied from the second upper limit value setting portion 74, or the second lower limit value SDLV supplied from the second lower limit setting portion 74 and supplying the selected value to an output terminal 90. The moving terminal of the second controlling switch 72 selects the second upper limit value SULV, the second lower limit value SDLV or the output data DSLP of the first controlling switch 66, as shown in FIG. 11B, according to the logic value of a carry signal CR1 supplied from a third counter 80, a carry signal CR2 supplied from a fourth counter 86, and the output signal of a NOR gate 84. The third counter 80 counts up by the FG pulse such as FIG. 10A supplied to its clock terminal from the FG head 14 shown in FIG. 7 through an input terminal 88 while a comparing signal CS1 of high logic state such as FIG. 10B is supplied from the first comparator 78 to its enable terminal. The third counter 80 generates a carry signal having a high logic state, as shown in FIG. 10D, when the counted value reaches a predetermined value. The comparing signal CS1 of the first comparator 78 as shown in FIG. 10C is generated when the speed error data DS larger than the first upper limit value FULV as shown in FIG. 10B is continued for a predetermined interval (i.e., until the drum motor 10 is started and reaches the target speed). Meanwhile, the fourth counter 84 counts up by FG pulse supplied to its clock terminal from the FG head 14 through the input terminal 88 while a comparing signal CS2 of high logic state is supplied from the second comparator 82 to its enable terminal. The fourth counter 84 generates a carry signal CR2 of high logic state when the counted value exceeds a predetermined value. The carry signal CR1 generated in the third counter 80 is generated when the number of FG pulses corresponding to the interval, i.e., from the starting of the drum motor 10 to the arriving at 70% of target speed, is counted by the third counter 80. The NOR gate 86 generates a reset signal RSS having a high logic state when both of the comparing signal CS1 supplied from the first comparator 78 and the comparing signal CS2 supplied from the second comparator 82 have low logic states, and supplies the generated reset signal RSS to the reset terminals RS of the third and fourth counters 80 and 84 and the second controlling switch 72. The third and fourth counter 80 and 84 initialize the counted value to be zero when a reset signal of high logic state is supplied to their reset terminals from the NOR gate 86. Also, the output terminal 90 supplies the output data DSL of moving terminal of the second controlling switch 72 to the comb-shaped filter 22 shown in FIG. 7. With reference to FIG. 10E, the second upper limit value SULV has a value smaller than the first upper limit value FULV and greater than the first lower limit value FDLV to slow down the rapidly decelerated speed of drum motor 10. The second lower limit value is set to be smaller than the second upper limit value SULV and greater than the first lower limit value FDLV to slow down the rapidly accelerated speed of drum motor 10. Also, the first and second upper limit values FULD and SULD are positive integers and the first and second lower limit values FDLV and SDLV are minus integers.

In conclusion, at the initial operation, the limiter 62 limits to the first upper limit value FULD the speed error data DS exceeding the first upper limit value of FULV until the speed of drum motor 10 reaches from zero to 70% of target speed, and outputs as a limited speed error data DSL a second lower limit value SALV instead of the speed error data DS exceeding the first upper limit value after the drum motor 10 reaches the 70% of the target speed and until the speed almost approaches the target speed.

At a still state, the limiter 62 limits the speed error data DS smaller than the first lower limit value FDLV to the first lower limit value FDLV until the speed of drum motor 10 reaches the 30% of the target speed, and outputs as a limited speed error data DSL the second upper limit value SULV instead of the speed error data DS smaller than the first lower limit value FDLV after the drum motor reaches the 30% of target speed and until the drum motor has almost zero speed.

At a normal state, the limiter 62 outputs as limited speed error data DSL the speed error data DS having the value between the first upper limit value SULV and the first lower limit value FLDV.

Moreover, at an overload state, the limiter 62 limits to a first lower limit value FDLV for a predetermined time the speed error data lower than the first lower limit value FDLV continued for more than a predetermined interval, and after a predetermined time, outputs as limited speed error data DSL the second upper limit value instead of the speed error data lower than the first lower limit value, thereby protecting the drum motor 10 from the overload.

Figure 12:
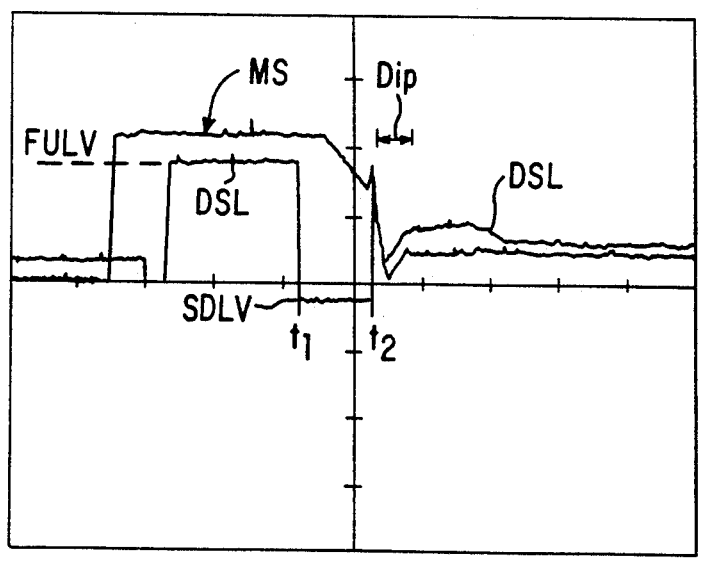
FIG. 12 shows an output characteristic view of the D-A converter for the output of the limiter shown in FIG. 7.

With reference to FIG. 12, the level variation of the speed control signal MS outputted in the D-A converter 44 according to the limited speed error data DSL supplied in the limiter 62 at the initial operation is shown. The speed control signal MS keeps a maximum level so that the drum motor 10 is accelerated while the limited speed control data DSL keeps the first upper limit value FULD, i.e., until the speed of the drum motor 10 reaches the 70% of the target speed. And the speed control signal MS slowly decreases from the maximum level to slow down the acceleration of the speed of the drum motor 10 while the limited speed control data DSL has a second lower limit value SDLV, i.e., from the time t1 of 70% speed of the drum motor 10 to the time t2 approached to the target speed. Also, the speed control signal MS varies as the level of limited speed error data DSL varies between the first upper limit value FULV and the second lower limit value SPLV after the speed of the drum motor 10 approaches the target speed. As a result, the speed control signal MS and the limited speed error data DSL have a very short stabilized time Dip after the drum motor 10 reaches the target speed.

FIG. 13 shows a control characteristic of the speed control signal MS of the speed controlling device according to the present invention, compared with the speed control signal So of the conventional rotation controlling device. In FIG. 13, when the drum motor 10 reaches the target speed, i.e., at the time t2, the conventional speed controlling signal So rapidly decreases from a maximum level to zero level and then keeps zero level for a predetermined interval, and then slowly increases from the zero level. Contrarily, the speed control signal MS of the present invention slowly decreases from the maximum level after the drum motor 10 reaches the 70% of the target speed, i.e., from the time t1, until the drum motor is rotated at a normal speed, i.e., to the time 3. As a result, the present invention improves the control characteristic by the area of triangle (shaded portion) formed by the present speed control signal MS and the conventional speed control signal So.

With reference to FIG. 14, the transient response characteristic CM of drum motor by the conventional rotation controlling device is compared with the transient response characteristic PM of drum motor by the rotation controlling device of the present invention. In FIG. 4, after the rotation speed of drum motor 10 by the conventional rotation controlling device initially reaches the target speed, it has a large width variation with respect to the target speed and a long stabilized time. On the other hand, the rotation speed of drum motor 10 by the rotation controlling device of the present invention needs a little bit longer interval to reach the initial target speed than that of the conventional rotation controlling device, but has a very small width variation with the respect to the target speed and a vary short stabilized time after the arriving at the initial target speed. Thus, the rotation controlling device of the present invention can drive the drum motor to be a normal driving mode faster than that the conventional rotation controlling device.

As described above, the present invention slowly decreases by a limiter the level of the speed control signal to be supplied to the drum motor at an initial operation before being arrived at the target speed, so that it has advantages of minimizing the transient response of the drum motor and shortening the time to stabilize the speed. From the advantages, the present invention has an advantage in that the time for the video signal to be muted at the starting of reproduction and record of VCR is shortened, to improve reliability of goods and make use more convenient. Also, the present invention limits the amplitude of the speed control signal to be supplied to the motor, thereby protecting the motor from the overload.

I claim:

1. A rotation controlling device for controlling a rotation speed of a motor comprising:
    a rotation detecting means for detecting a rotation speed of a motor,
    a signal processing means for generating a control signal for constantly controlling said motor rotation speed in response to the rotation speed detected by said rotation detecting means;
    a comb-shaped filter means for removing a rotation period component and its harmonic component included in a control signal supplied from said signal processing means;
    a control means for varying a transfer function of said comb-shaped filter means at a transient response and a normal response according to said motor rotation speed;
    a driving means for driving said motor in response to said filtered control signal supplied from said comb-shaped filter means; and
    a limit means connected between said signal processing means and said comb-shaped filter means, for limiting the level of said control signal, wherein said limit means comprises:
        an upper limit value generating means for generating an upper limit value;

a first comparing means for comparing a control signal supplied from said signal processing means with an upper limit value supplied from said upper limit value generating means;

a first switching means for switching a control signal supplied from said signal processing means and an upper limit value supplied from said upper limit value generating means according to a logic state of a comparing signal supplied from said first comparing means;

a lower limit value generating means for generating a lower limit value;

a second switching means for switching an output of said first switching means and a lower limit value supplied from said lower limit value generating means to said comb-shaped filter means; and a second controlling means for making said second switching means select a lower limit value while a predetermined logic state of a comparing signal generated in said first comparing means exceeds a first predetermined interval.

2. A device as claimed in claim 1, further comprising a means connected between said comb-shaped filter means and said driving means, for converting said filtered control signal into an analog signal.

3. A device as claimed in claim 2, wherein said digital-analog converting means comprises:

a means for generating a timing pulse having a pulse width corresponding to a logic value of control signal supplied from said comb-shaped filter means; and a means for integrating the timing pulse supplied from said timing pulse generating means and supplying the integrated signal to said driving means.

4. A device as claimed in claim 3, wherein said filtered control signal has plus and minus logic values and said timing pulse has three-state logic.

5. A device as claimed in claim 1, wherein said limit means further comprises:

a second comparing means for comparing a lower limit value supplied from said lower limit value generating means with a control signal supplied from said signal processing means; and a third switching means connected between said first switching means, said lower limit value generating means and said second switching means, for switching an output of said first switching means and a lower limit value supplied from said lower limit value generating means according to a logic state of a comparing signal supplied from said second comparing means.

6. A device as claimed in claim 5, wherein said limit means further comprises:

a fourth switching means connected between said upper limit value generating means, said second switching means, and said comb-shaped filter means, for switching an upper limit value supplied from said upper limit value generating means and an output of said second switching means; and a third control means for making said fourth switching means select said upper limit value while a predetermined logic state of a comparing signal generated in said second comparing means exceeds a second predetermined interval.

7. A device as claimed in claim 6, wherein said first predetermined interval is the needed interval for the speed of motor to reach 70% of target speed.

8. A device as claimed in claim 7, wherein said limit means further comprises a logic operation means for operating logic states of comparing signals supplied from said first and second comparing means to reset said second and third control means.

9. A device as claimed in claim 8, wherein said second and third control means comprise a counter and said logic operation means comprises a NOR gate.

10. A rotation controlling device for controlling a rotation speed of a motor comprising:

a rotation detecting means for detecting a rotation speed of a motor;

a signal processing means for generating a control signal for constantly controlling said motor rotation speed in response to the rotation speed detected by said rotation detecting means;

a comb-shaped filter means for removing a rotation period component and its harmonic component included in a control signal supplied from said signal processing means;

a control means for varying a transfer function of said comb-shaped filter means at a transient response and a normal response according to said motor rotation speed;

a driving means for driving said motor in response to said filtered control signal supplied from said comb-shaped filter means; and a limit means connected between said signal processing means and said comb-shaped filter means, for limiting the level of said control signal, wherein said limit means comprises:

a first upper limit value generating means for generating a first upper limit value;

a second upper limit value generating means for generating a second upper limit value;

a first lower limit value generating means for generating a first lower limit value;

a second lower limit value generating means for generating a second lower limit value;

a first comparing means for comparing a first upper limit value supplied from said first upper limit value generating means with a control signal supplied from said signal processing means;

a second comparing means for comparing a first lower limit value supplied from said first lower limit value generating means with a control signal supplied from said signal processing means;

a first switching means for switching a control signal supplied from said signal processing means and a first upper limit value supplied from said first upper limit value generating means and a first lower limit value supplied from said first lower limit value generating means according to logic values of comparing signals supplied from said first and second comparing means;

a first count means for counting the interval for a comparing signal generated in said first comparing means to keep a predetermined logic state and generating a carry signal when the counted value exceeds a predetermined value;

a second count means for counting the interval for a comparing signal generated in said second comparing means to keep a predetermined logic state and generating a carry signal when the counted value exceeds a predetermined value;

a gate means for timing said counter according to logic values of comparing signals supplied from said first and second comparing means; and a second switching means for switching a second upper limit value supplied from said second upper limit value generating means, a second lower limit value supplied from said second lower limit value generating means and an output of said first switching means to said comb-shaped filter means, according a logic value of carry signals supplied from said first and second count means and an output of said gate means.

11. A device as claimed in claim 10, wherein said first upper limit value is greater than said second upper limit value and said second lower limit value is greater than said first lower limit value, and said second upper limit value is set to be greater than said second lower limit value.

12. A device as claimed in claim 1, further comprising a compensating means connected between said comb-shaped filter means and said digital-analog converting means, for compensating said filtered control signal.

13. A rotation controlling device for controlling a rotation speed of a motor comprising:
a rotation detecting means for detecting a rotation speed of a motor;
a signal processing means for generating a control signal for constantly controlling said motor rotation speed in response to the rotation speed detected by said rotation detecting means;
a comb-shaped filter means for removing a rotation period component and its harmonic component included in a control signal supplied from said signal processing means;
a control means for varying a transfer function of said comb-shaped filter means at a transient response and a normal response according to said motor rotation speed;
a driving means for driving said motor in response to said filtered control signal supplied from said comb-shaped filter means; and
a limit means connected between said comb-shaped filter and said driving means, for limiting the level of said control signal, wherein said limit means comprises:
an upper limit value generating means for generating an upper limit value;
a first comparing means for comparing a control signal supplied from said signal processing means with an upper limit value supplied from said upper limit value generating means;
a first switching means for switching a control signal supplied from said signal processing means and an upper limit value supplied from said upper limit value generating means according to a logic state of a comparing signal supplied from said first comparing means;
a lower limit value generating means for generating a lower limit value;
a second switching means for switching an output of said first switching means and a lower limit value supplied from said lower limit value generating means to said comb-shaped filter means; and
a second controlling means for making said second switching means select a lower limit value while a predetermined logic state of a comparing signal generated in said first comparing means exceeds a first predetermined interval.

14. A rotation controlling device for controlling a speed of a drum motor in a video cassette recorder comprising:
a rotation detecting means comprising a frequency generator head and a phase generator head, said frequency generator head detecting an angular speed of said drum motor and said phase generator head detecting a rotation phase of said drum motor;
a first signal processing means for generating speed control data for constantly controlling a rotation speed of said drum motor in response to the angular speed detected by said frequency generator speed;
a comb-shaped filter means for removing a rotation period component and its harmonic component included in said first control data supplied from said first signal processing means;
a control means for varying a transfer function of said comb-shaped filter means at an initial operation and a normal operation, according to a rotation speed of said drum motor;
a limit means connected between said comb-shaped filter means and said signal processing means, for limiting said speed control data;
a second signal processing means for generating phase control data for constantly controlling a rotation phase of said drum motor by said detected rotation phase supplied from said phase generator head;
an addition means for adding said speed control data and phase control data supplied from said comb-shaped filter means; and
a means for driving said drum motor according to a motor control signal supplied from said digital-analog converting means,
wherein said limit means comprises:
an upper limit value generating means for generating an upper limit value;
a first comparing means for comparing a control signal supplied from said signal processing means with an upper limit value supplied from said upper limit value generating means;
a first switching means for switching a control signal supplied from said signal processing means and an upper limit value supplied from said upper limit value generating means according to a logic state of a comparing signal supplied from said first comparing means;
a lower limit value generating means for generating a lower limit value;
a second switching means for switching an output of said first switching means and a lower limit value supplied from said lower limit value generating means to said comb-shaped filter means; and
a second controlling means for making said second switching means select a lower limit value while a predetermined logic state of a comparing signal generated in said first comparing means exceeds a first predetermined interval.

15. A device as claimed in claim 14, wherein said limit means further comprises:
a second comparing means for comparing a lower limit value supplied from said lower limit value generating means with a control signal supplied from said signal processing means; and
a third switching means connected between said first switching means, said lower limit value generating means and said second switching means, for switching an output of said first switching means and a lower limit value supplied from said lower limit value generating means according to a logic state of comparing signals supplied from said second comparing means.

16. A device as claimed in claim 15, wherein said limit means further comprises;
   a fourth switching means connected between said upper limit value generating means, said second switching means and said comb-shaped filter means, for switching a upper limit value supplied from said upper limit value generating means and an output of said second switching means; and
   a third control means for making said fourth switching means select said upper limit value while a predetermined logic state of comparing signal generated in said second comparing means exceeds a second predetermined interval.

17. A device as claimed in claim 16, wherein said first predetermined interval is the interval needed for said motor speed to reach 70% of target speed from zero speed.

18. A device as claimed in claim 17, wherein said limit means further comprises a logic operation means for operating logic states of comparing signals supplied from said first and second comparing means to reset said second and third control means.

* * * * *